United States Patent [19]
Naito

[11] Patent Number: 5,686,770
[45] Date of Patent: Nov. 11, 1997

[54] POSITION DETECTOR OF A BRUSHLESS MOTOR

[75] Inventor: Hayato Naito, Nagano, Japan

[73] Assignee: Kabushiki Kaisha Sankyo Seiki Seisakusho, Nagano, Japan

[21] Appl. No.: 553,098

[22] Filed: Nov. 3, 1995

[51] Int. Cl.$^6$ .............................. H02K 29/06; H02P 6/16
[52] U.S. Cl. .................. 310/68 B; 310/68 R; 310/156; 318/254; 318/138
[58] Field of Search ................ 310/68 B, DIG. 3, 310/156; 318/254, 138, 461, 463, 466

[56] References Cited

U.S. PATENT DOCUMENTS

| | | | |
|---|---|---|---|
| 4,639,648 | 1/1987 | Sakamoto | 318/254 |
| 4,658,190 | 4/1987 | Miyazaki et al. | 318/254 |
| 4,918,346 | 4/1990 | Tajima et al. | 310/156 |
| 4,968,913 | 11/1990 | Sakamoto | 310/68 B |
| 5,041,769 | 8/1991 | Iwai | 318/254 |
| 5,552,682 | 9/1996 | Ushikoshi . | |

FOREIGN PATENT DOCUMENTS

| | | | |
|---|---|---|---|
| 02-84045 | 3/1990 | Japan | 318/254 |
| 94/26022 | 11/1994 | WIPO | 318/254 |

*Primary Examiner*—Thomas M. Dougherty
*Assistant Examiner*—B. Mullins
*Attorney, Agent, or Firm*—Sughrue,Mion,Zinn,Macpeak & Seas, PLLC

[57] ABSTRACT

The magnetic pole 16b for positional detection is attached to the magnetic pole 16a for driving of the rotor magnet 16 at a position shifted from the magnetic center C of the magnetic pole for driving by an electrical angle of about 30°. Due to the foregoing, the magnetic detector for driving is used as a magnetic detector for positional detection, so that the position detecting signal "c" can be obtained in a good condition. Therefore, it is unnecessary to provide a magnetic detector and a magnet piece which are conventionally used, so that the cost can be reduced, and it is also unnecessary to attach the magnet piece and the magnetic detector onto the base board. Accordingly, the manufacturing cost can be reduced, and further it is not required to maintain a space for installing the magnetic detector and the wiring thereof. In this way, it is possible to reduce the dimensions of the motor.

12 Claims, 8 Drawing Sheets

FIG. 4(a) OUTPUT WAVEFORM OF HALL ELEMENT

FIG. 4(b) $H_1+H_3$ (SYNTHESIZED WAVEFORM)

FIG. 4(c) COMPARATOR OUTPUT

FIG. 4(d) LOGICAL PRODUCT OF COMPARATOR OUTPUT (AND)

FIG. 5(a) SERIES

FIG. 5(b) PARALLEL

FIG. 5(c) SERIES AND PARALLEL

WAVEFORM OF MAGNETIC INTENSITY

ROTATIONAL DIRECTION OF THE MAGNET

FIG. 8(b)

WAVEFORM OF MAGNET INTENSITY

ONE REVOLUTION 5,686,770

POSITION DETECTOR OF A BRUSHLESS MOTOR

BACKGROUND OF THE INVENTION

1. Field of the Invention

The present invention relates to a position detector for positional detection of the rotor of a brushless motor.

2. Related Art

Figure 9:
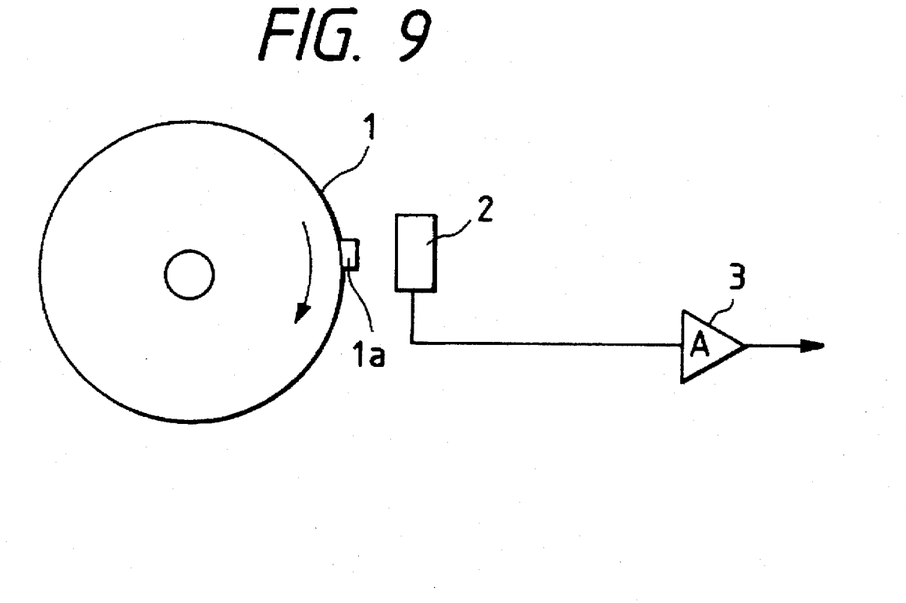
FIG. 9 is an arrangement view showing an outline of the position detector of the prior art.
Figure 10:
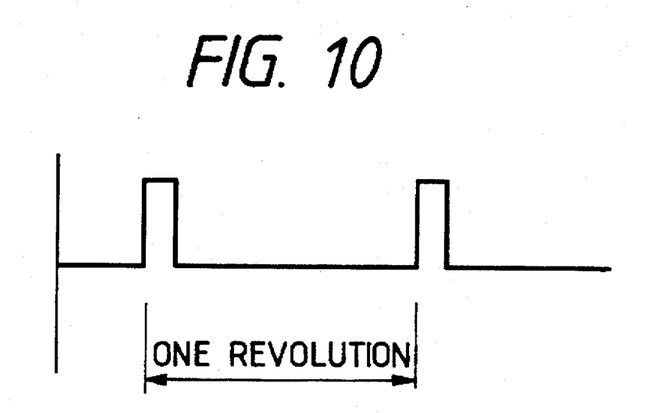
FIG. 10 is a waveform diagram showing a position detecting signal of the position detector shown in FIG. 9.

Conventionally, positional detection in a brushless motor is conducted as follows. For example, as illustrated in FIG. 9, a magnetic field of the magnet piece 1a mounted on an outer circumferential surface of the rotor 1 is detected by the magnetic head 2 arranged at a position opposed to the outer circumferential surface of the rotor 1. An output signal of the magnetic head 2 is amplified by the amplifier 3. In this way, a pulse signal, the period of which is one revolution of the rotor 1, is obtained in such a manner that one pulse signal is generated per one revolution of the rotor 1 as illustrated in FIG. 10. By the pulse signal, positional detection of the brushless motor can be accomplished.

However, in the conventional position detector described above, it is necessary to provide the magnet piece 1a and the magnetic head 2 for positional detection. Therefore, the number of parts is increased, so that the cost is raised. When the magnetic detector such as a magnetic head 2 is used, it is necessary to provide an electric wiring on a base board (printed board). Accordingly, the assembling work becomes complicated. Since the magnetic detector is arranged at a position opposed to an outer circumferential surface of the rotor magnet 1 and further a large space is required for providing the electric wiring on the base board, it is difficult to reduce the size of the base board.

In order to solve the above problems, in Unexamined Japanese Patent Publication No. 6-174410, the magnet piece for detecting a rotor position and the magnetic pole detector are not required. In the device relating to the above proposal, a sine wave having one pulse-like peak per one revolution is compared with a waveform obtained when this sine wave is subjected to logarithmic compression so as to remove the peak, by a differential amplifier. In this way, the pulse-like peak of the sine wave is picked up to be used as a pulse for positional detection.

However, the above device proposed by the present inventors is disadvantageous in that the detecting operation is affected by the variation of sensitivity of the magnetic detector and also affected by the temperature characteristic, so that the reliability of the device is low. For example, the following problems may be encountered. When an output of the magnetic detector is lowered, it is impossible to conduct the logarithmic compression on the sine wave having a pulse-like peak. When an output of the magnetic detector is increased, the pulse-like peak is deformed in the process of amplification.

SUMMARY OF THE INVENTION

It is an object of the present invention to provide a position detector of a brushless motor having a simple structure capable of positively taking out a positional detection signal.

In order to accomplish the above object, the position detector of a brushless motor of the present invention comprises: a rotor magnet to which the N and S magnetic poles used for driving are alternately magnetized, the rotor magnet being rotated integrally with a rotary shaft; a magnetic pole for positional detection magnetized to at least one of the magnetic poles used for driving at a position shifted from a magnetic center of the magnetic pole for driving by an electrical angle of about 30°; a magnetic detector for detecting the magnetic fields of both the magnetic pole for driving and the magnetic pole for positional detection, the magnetic detector being opposed to the rotor magnet; and a position signal generator for separating a driving signal and a position detecting signal from an output signal of the magnetic detector so that the driving signal and the position detecting signal can be formed.

In addition to the above composition, the position signal generator of the position detector of the present invention includes an electric circuit in which a position detecting signal is formed from output signals of 3 sets of magnetic detectors by means of synthesizing and shaping of waveforms.

In addition to the above composition, the position signal generator of the position detector of the present invention includes an electric circuit in which the pulse width of rectangular waves obtained by shaping the waveform of the output signal of the magnetic detector is compressed and elongated.

According to the position detector of each means described above, the magnetic detector for driving is also used as a magnetic detector for positional detection. Therefore, it is possible to reduce the number of parts such as a magnetic detector and a magnet piece which have been conventionally used, so that the cost can be reduced. Further, it is unnecessary to provide the magnet piece, and it is also unnecessary to attach the magnetic detector onto the base board. Accordingly, the manufacturing cost can be reduced. Furthermore, a space for accommodating the magnetic detector can be omitted, and also a space for accommodating the wiring of the magnetic detector can be omitted. As a result, it is possible to downsize the base board.

According to the present invention, the magnetic pole for positional detection is magnetized at a position shifted from the magnetic center of the magnetic pole for driving by an electrical angle of about 30°. Therefore, the positional detection signal having a predetermined pulse width can be positively taken out.

DETAILED DESCRIPTION OF THE PREFERRED EMBODIMENTS

With reference to the accompanying drawings, an embodiment of the present invention will be explained as follows.

Figure 1:
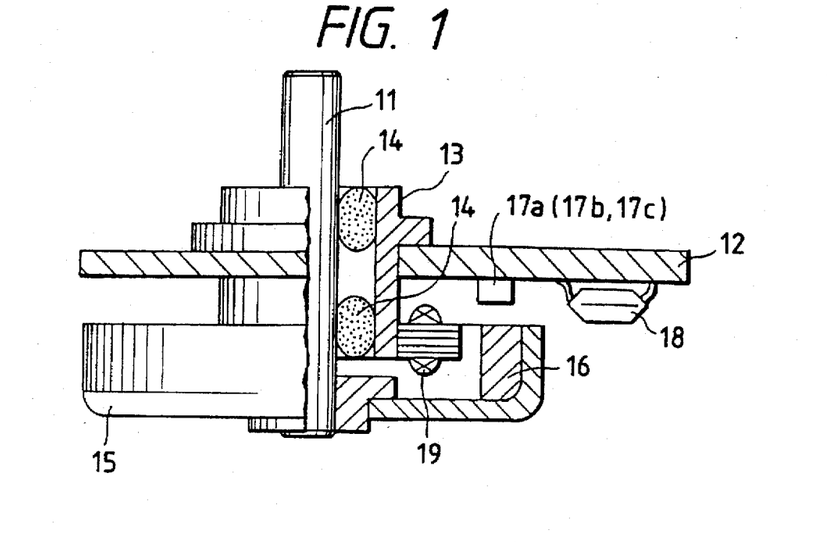
FIG. 1 is a half-sectional view showing an overall arrangement of a brushless motor to which the present invention is applied.

An arrangement of the brushless motor to which the present invention is applied is shown in FIG. 1.

There is shown a three-phase brushless motor in FIG. 1. In FIG. 1, reference numeral 11 is a rotary shaft. This rotary shaft 11 is rotatably supported by the bearing 14 accommodated in the bearing holder 13 vertically magnetized onto the circuit base board 12. A dish-shaped rotor 15 rotated integrally with the rotary shaft 11 is fixed to a lower end portion of the rotary shaft 11. There is provided an annular rotor magnet 16 on an inner circumferential surface of the outer flange portion of the rotor 15. The rotor magnet 16 includes a magnetic pole 16a used for driving in which the N and S poles are alternately arranged as shown in FIG. 3.

Figure 3:
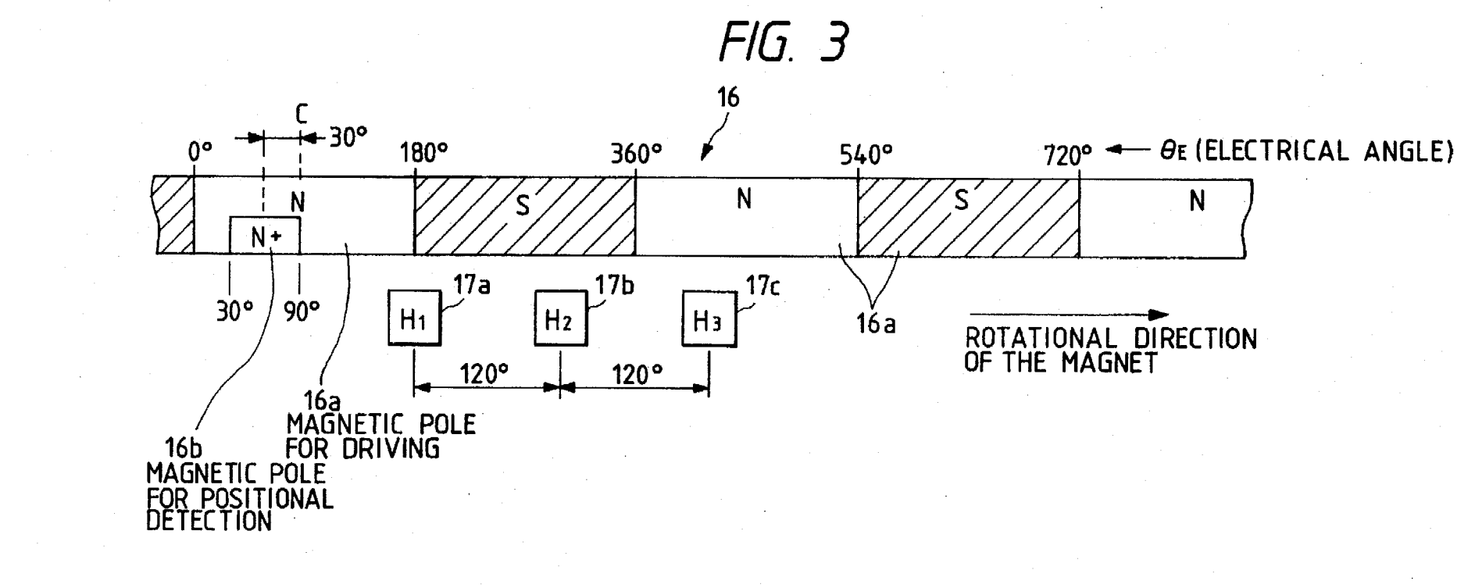
FIG. 3 is a development view of the rotor magnet assembled in the motor shown in FIG. 1.

Further, a magnetic pole 16b used for positional detection is magnetized to one of the N poles of the magnetic pole 16a used for driving of the rotor magnet 16, that is, a magnetic pole 16b used for positional detection is magnetized to the N pole disposed at the left end in FIG. 3. In this case, the magnetic pole 16b used for positional detection is magnetized to one of the magnetic poles 16a magnetized in the N pole so that the N pole of the magnetic pole 16a for driving can be further strengthened (shown by the sign + in FIG. 3). A magnetic center of the magnetized portion of the magnetic pole 16b is arranged at a position shifted from the magnetic center C of the magnetic pole 16a for driving by an electrical angle of about 30°.

In this connection, in the case illustrated in FIG. 3, the magnetic center C of the magnetic pole 16a for driving is shifted to the rear side with respect to the rotational direction of the magnet by an electrical angle of about 30°, however, the magnetic center C of the magnetic pole 16a for driving may be shifted to the front side with respect to the rotational direction of the magnet.

Three Hall elements 17a, 17b, 17c, which are used as magnetic detectors, are arranged in such a manner that the Hall elements 17a, 17b, 17c are opposed to a magnetic surface of the rotor magnet 16. Two adjacent Hall elements among the three Hall elements 17a, 17b, 17c are disposed at a regular interval of the electrical angle 120°. As shown in FIG. 1, these three Hall elements 17a, 17b, 17c are attached onto the circuit base board 12, and a driving IC 18 is mounted on the circuit base board 12.

Figure 2:
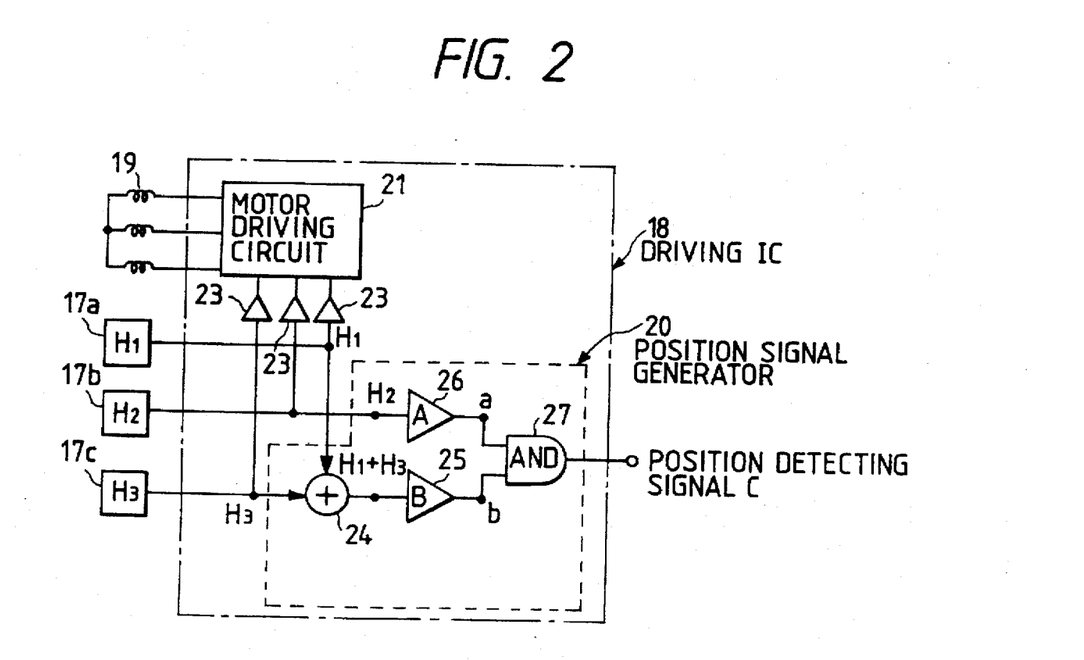
FIG. 2 is a block diagram showing a position detector of an embodiment of the present invention.

The driving IC 18 is connected to an output end of each Hall element 17a, 17b, 17c. As shown in FIG. 2, the driving IC 18 includes a position signal generator 20 and a motor drive circuit 21. The position signal generator 20 has a function of synthesizing a position detecting signal from the output signals $H_1$, $H_2$, $H_3$ sent from the Hall elements 17a, 17b, 17c, so that the position detecting signal can be formed. The motor driving circuit 21 has a function of receiving output signals from the Hall elements 17a, 17b, 17c and supplying a driving current to the driving coil 19 opposed to an inner circumference of the rotor magnet 16.

As shown in FIG. 2, the output signals $H_1$, $H_2$, $H_3$ sent out from the three Hall elements 17a, 17b, 17c branch off in two directions. One is a direction of the position signal generator 20, and the other is a direction of the motor driving circuit 21. In this way, the output signals $H_1$, $H_2$, $H_3$ are respectively impressed upon the position signal generator 20 and the motor driving circuit 21. In this case, the output signals $H_1$, $H_2$, $H_3$ are impressed upon the motor driving circuit 21 via the Hall signal differential amplifier 23 in which the output signals of the Hall elements 17a, 17b, 17c are subjected to logarithmic compression while they are amplified.

In the position signal generator 20, there is provided an analog adder 24 in which the output signals $H_1$ and $H_3$ sent out from the two Hall elements 17a, 17c, which are among the three Hall elements 17a, 17b, 17c, are synthesized. Further, in the position signal generator 20, there are provided a comparator 25, serving as a first comparator, in which the wave-forms of the synthesized signal ($H_1+H_3$) obtained by the analog adder 24 are shaped so as to provide a predetermined rectangular wave, and a comparator 26, serving as a second comparator, in which the waveform of the output signal $H_2$ sent out from the residual Hall element 17b is shaped so as to provide a predetermined rectangular wave. Further, on the output side of both comparators 25, 26, there is provided an AND circuit 27 to obtain a logical product of the output signals "a" and "b" of both comparators 25, 26. An output signal "c" is obtained from this AND circuit 27 so as to be used as a position signal.

Operation of the position detector of a brushless motor having the above arrangement will be explained as follows.

Figure 4A:
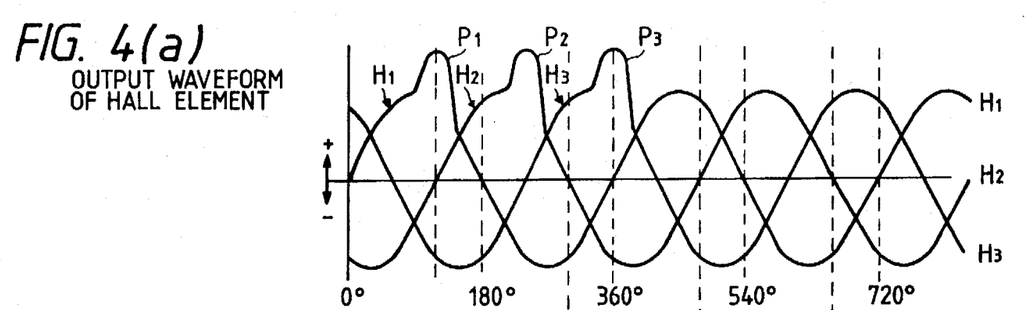
FIGS. 4(a) through 4(d) are signal waveform diagrams for explaining the circuit operation of the position detector shown in FIG. 2.

First of all, when a voltage is impressed upon the driving coil 19, the rotor 15 starts rotating. Due to the foregoing, the magnetic pole 16a used for driving of the rotor magnet 16 is opposed to the three Hall elements 17a, 17b, 17c in such a manner that the N and S poles are alternately disposed with each other. In accordance with the direction of the magnetic field, the output signals $H_1$, $H_2$, $H_3$, the waveforms of which are sine waves, are respectively outputted from the Hall elements 17a, 17b, 17c as shown in FIG. 4(a).

In this case, as described above, the magnetic pole 16b (N pole+) used for positional detection is magnetized to one of the magnetic poles 16a used for driving of the rotor magnet 16. Due to the foregoing, pulse-like peak portions $p_1$, $p_2$, $p_3$ make an appearance in the output signals $H_1$, $H_2$, $H_3$ of the Hall elements 17a, 17b, 17c corresponding to the magnetic pole 16b for positional detection when the rotor magnet 16 is rotated by one revolution. Since the magnetic pole 16b for positional detection is disposed at a position where the electrical angle is shifted from the magnetic center C of the magnetic pole 16a for driving by about 30°, the pulse-like peak portions $p_1$, $p_2$, $p_3$ are correspondingly formed at positions slightly shifted from the peak portions of the sine wave by the electrical angle about 30°.

The output signals $H_1$, $H_2$, $H_3$ of the Hall elements 17a, 17b, 17c are respectively impressed upon the motor driving circuit 21 and the position signal generator 20. In this case, signals, from which the pulse-like peak portions $p_1$, $p_2$, $p_3$ are cut by the action of logarithmic compression of the Hall signal differential amplifier 23, are inputted into the motor driving circuit 21 so that the inputted signals can be used as motor driving signals. In accordance with these motor driving signals, the driving currents are alternatively switched and sent out to a plurality of the driving coils 19, and the rotor 15 is rotated by electromagntic effect with respect to the rotor magnet 16.

Figure 4B:
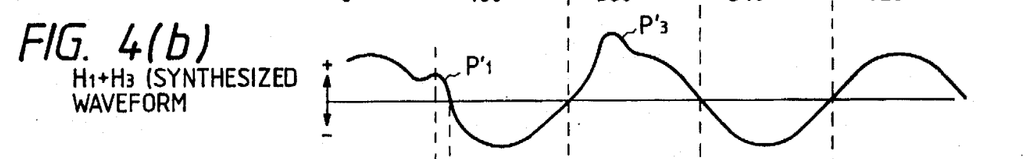

On the other hand, the output signals $H_1$, $H_2$, $H_3$ of the Hall elements 17a, 17b, 17c are inputted into the position signal generator 20 under the condition that the output signals $H_1$, $H_2$, $H_3$ are not changed at all. After the output signals $H_1$, $H_3$ of the Hall elements 17a, 17c have been inputted into the position signal generator 20, they are synthesized by the analog adder 24, and the synthesized waveform shown in FIG. 4(b) is provided. In the synthesized waveform, there are formed pulse-like peak portions $p_1$, $p_3$, corresponding to the peak portions $p_1$, $p_3$ of the output signals $H_1$, $H_3$.

Figure 4C:
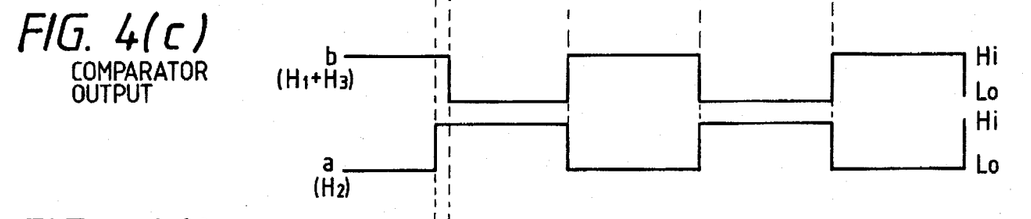

Next, the synthesized wave-forms of the output signals $H_1$, $H_3$ sent out from the Hall elements 17a, 17c are shaped by the comparator 25, so that the rectangular wave represented by the character "b" in FIG. 4(c) can be provided. On the other hand, the waveform of the output signal $H_2$ sent out from the Hall element 17b is shaped by the comparator 26, so that the rectangular wave represented by the character "a" in FIG. 4(c) can be provided.

Concerning the rectangular wave "b", the pulse width of the Hi signal is slightly elongated in a region corresponding to the pulse-like peak portion $p_1$, in the synthesized waveform shown in FIG. 4(b). This pulse width elongated portion makes an appearance once per one revolution. In this connection, the pulse width of the rectangular wave "b" is not elongated or shortened by the pulse-like peak portion $p_3$, of the synthesized waveform. Also, in the rectangular wave "a", the pulse width is not elongated or shortened.

Figure 4D:
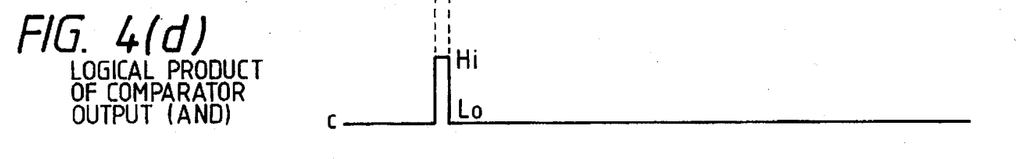

Then the logical product of the rectangular waves "a" and "b" are obtained by AND circuit 27, and the position detection signal "c" shown in FIG. 4(d) is outputted from AND circuit 27 in timed relation in which both the rectangular waves "a" and "b" become the $H_1$ signal. Since this position detection signal "c" is outputted in accordance with the pulse width elongated portion of the rectangular wave "b", it makes an appearance once per one revolution.

As described above, in this embodiment, the magnetic detector for driving is also used as a magnetic detector for positional detection. Therefore, the number of parts such as a magnetic detector and a magnet piece, which are conventionally used, is decreased, so that the cost can be reduced, and further it becomes unnecessary to attach the magnet piece and to assemble the magnetic detector onto the base board. Furthermore, a space necessary for installing the magnetic detector and the wiring can be omitted.

In this connection, in the above embodiment, a magnetic center of the magnetic pole 16b for positional detection is magnetized at a position shifted from the magnetic center C of the magnetic pole 16a for driving by an electrical angle of about 30°. However, as long as the magnetic center C of the magnetic pole 16a for driving is shifted from the magnetic center of the magnetic pole 16b for positional detection by a predetermined angle, the approximately same effect can be provided, and the position detection signal can be positively obtained.

According to the present invention, the magnetic center of the magnetic pole 16b for positional detection of the rotor magnet 16 is shifted from the magnetic center C of the magnetic pole 16a for driving by an electrical angle of about 30°. Accordingly, the position detecting signal "c" having a predetermined pulse width can be positively obtained.

Figure 5A:
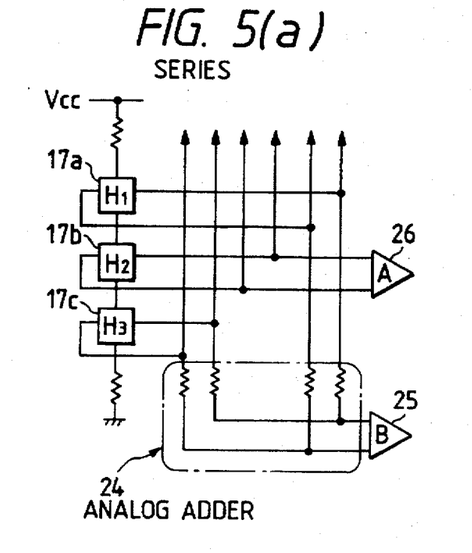
FIGS. 5(a) through 5(c) are circuit diagrams showing an example of actual connection of the magnetic detector.
Figure 5B:
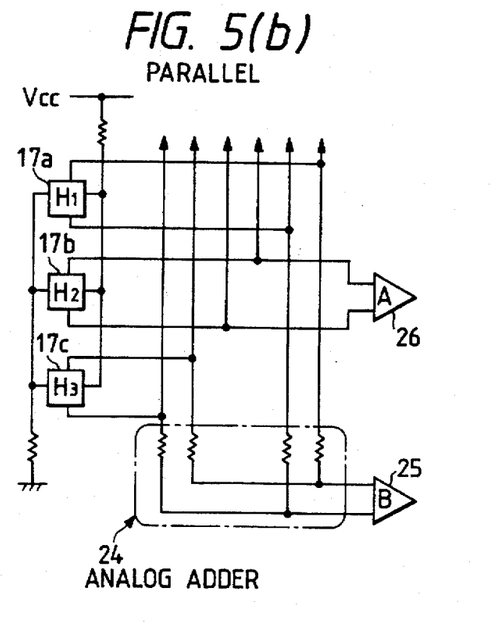
Figure 5C:
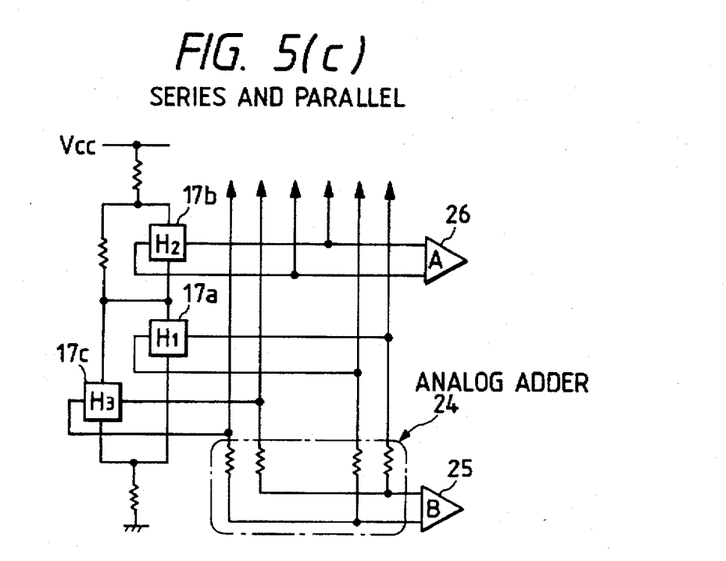

Concerning the actual connection circuit of the Hall elements 17a, 17b, 17c, there are provided a series connection circuit shown in FIG. 5(a), a parallel connection circuit shown in FIG. 5(b), and a series and parallel connection circuit shown in FIG. 5(c). In this connection, in the above FIGS. 5(a), 5(b) and 5(c), there is shown an example of the analog adder 24.

Figure 6A:
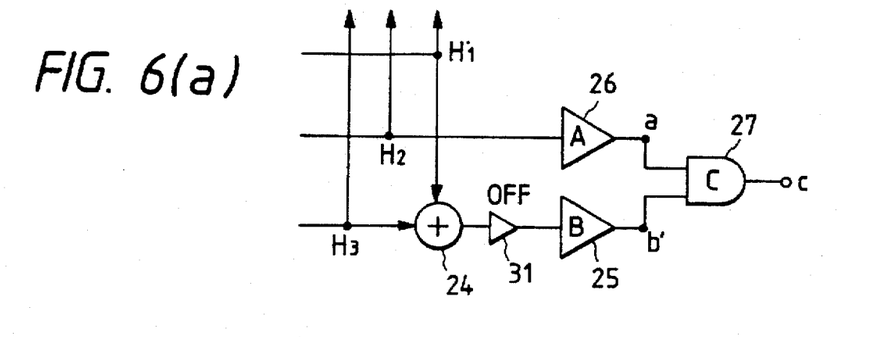
FIGS. 6(a) through 6(c) are blocks diagram showing a position detector of another embodiment of the present invention.
Figure 6B:
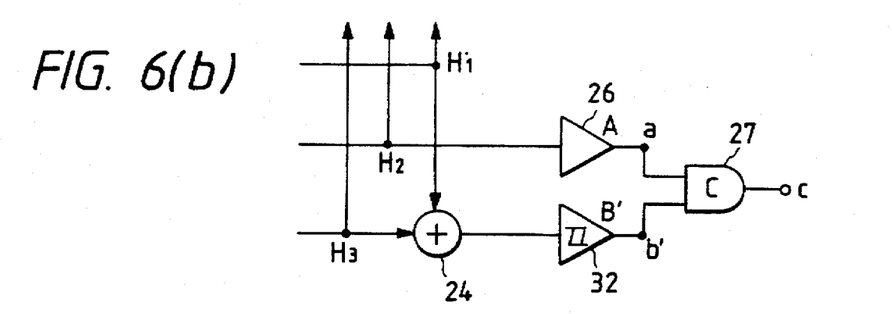

In FIGS. 6(a) and 6(b), like reference characters are used to indicate like parts in the views explained above. The position signal generator in the embodiment shown in FIGS. 6(a) and 6(b) has a circuit in which the pulse width of a rectangular wave is compressed and elongated.

In the embodiment shown in FIG. 6(a), the output signals $H_1$, $H_3$ sent from the Hall elements 17a, 17c are inputted into the analog adder 24, and the synthesized waveform of the output signals $H_1$, $H_3$ is outputted from the analog adder 24 and impressed upon the comparator 25 via the offset amplifier 31. In the embodiment shown in FIG. 6(b), the output signals $H_1$, $H_3$ sent out from the Hall elements 17a, 17c are inputted into the analog adder 24, and the synthesized waveform of the output signals $H_1$, $H_3$ is outputted from the analog adder 24 and impressed upon the comparator 32 having a function of hysteresis.

Figure 7A:
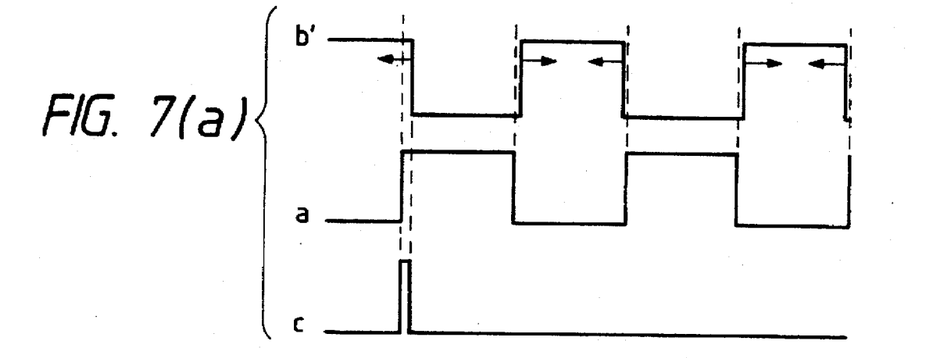
FIGS. 7(a) and 7(b) are signal waveform diagrams for explaining the circuit operation of the position detector shown in FIG. 6.

According to the embodiments shown in FIGS. 6(a) and 6(b), the position detection signal is obtained in the manner shown in FIG. 7(a). That is, when the synthesized signal obtained by synthesizing the output signals $H_1$ and $H_3$ sent out from the Hall elements 17a, 17c is subjected to waveform-shaping, the rectangular wave "b'" is obtained. In the rectangular wave "b'", the pulse width in the Hi region is slightly compressed, and the pulse width in the Lo region is slightly elongated. Accordingly, when the logical product of the rectangular waves "b'" and "a" is obtained in the AND circuit 27, there is no possibility that both rectangular waves simultaneously become Hi signals at the time except for the original position detection. Due to the foregoing, the occurrence of erroneous signals can be prevented.

Figure 6C:
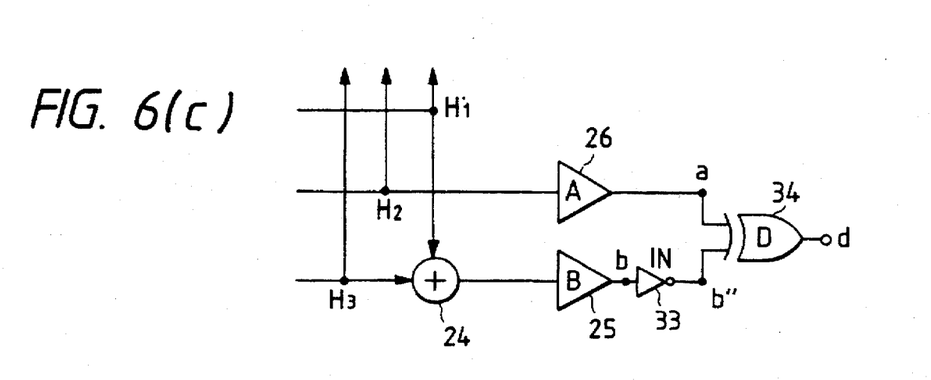
Figure 7B:
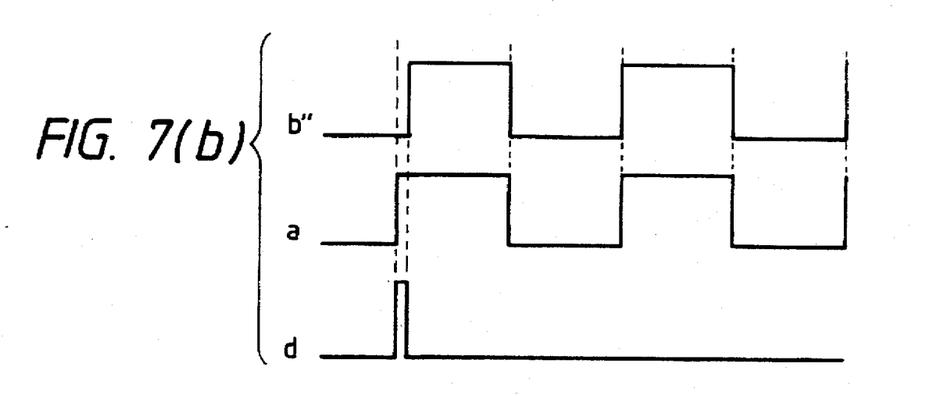

In FIG. 6(c), like reference characters are used to indicate like parts in the views explained above. In the position signal generator of the embodiment shown in FIG. 6(c), when the synthesized signal obtained by synthesizing the output signals $H_1$ and $H_3$ sent out from the Hall elements 17a, 17c is subjected to waveform-shaping by the comparator 25, the rectangular wave "b" is obtained. The rectangular wave "b" is inverted by the inverter 33 which composes the negative logic, so that the rectangular wave "b" is changed into the rectangular wave "b''" shown in FIG. 7(b). This rectangular wave "b''''" is impressed upon Ex.OR circuit 34. In Ex.OR circuit 34, exclusive OR of the rectangular wave "b''''" and the rectangular wave "a" sent from the other comparator 26 is obtained, so that the same position detection signal "d" as that of the above embodiment can be provided.

Figure 8A:
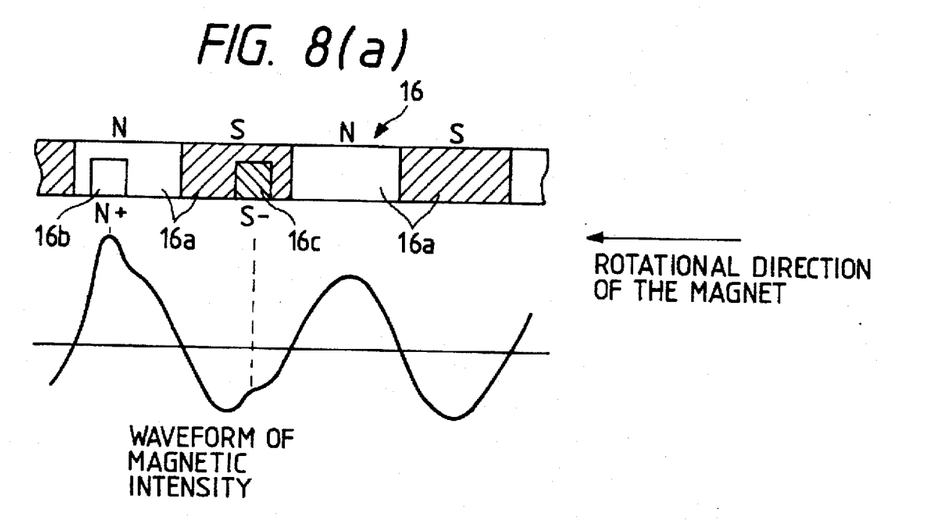
FIGS. 8(a) and 8(b) are development views of the rotor magnet of another embodiment of the present invention.

In the embodiment shown in FIG. 8(a), there is provided a first magnetic pole 16b for positional detection magnetized to the magnetic pole 16a of the N pole for driving of the rotor magnet 16 in such a manner that a magnetic center of a mangetized portion of the magnetic pole is shifted by the electric angle about 30° downstream with respect to the rotation direction, and further there is provided a magnetic pole 16c for positional detection of the S pole positioned in vicinity of the N pole. A second magnetic pole 16c for positional detection is magnetized in such a manner that the S pole of the magnetic pole 16a for driving magnetized to the S pole is slightly weakened (represented by the sign – in the drawing). This magnetic pole 16c for positional detection is disposed at a position shifted from the magnetic center of the S pole of the magnetic pole 16a for driving by an electrical angle of about 30° downstream with respect to the rotation direction. When the magnetic poles for positional detection are provided at two positions as described above, the pulse width of the position detecting signal is extended, so that the position detecting signal is emphasized to conduct the positional detection more positively.

Figure 8B:
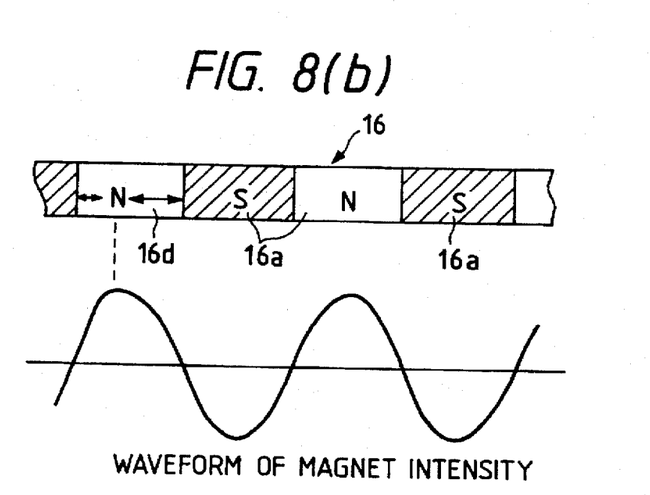

On the other hand, in the embodiment shown in FIG. 8(b), the magnetic pole 16d for positional detection is formed in such a manner that the magnetic center of one of the magnetic poles 16a for driving of the rotor magnet being magnetized in a plurality poles is shifted from the original position by an electrical angle of about 30°. In this embodiment, it is possible to provide the same operational effect as that of each embodiment described before.

The invention accomplished by the present inventors is specifically explained above with reference to embodiments, however, it should be understood that the invention is not intended to be limited to the specific embodiments. Variations may be made by one skilled in the art without departing from the spirit and scope of the invention. For example, in each embodiment described above, it is possible to reverse the polarity of the magnetic pole for positional detection, and it is also possible to provide magnetic poles for positional detection at a plurality of positions with respect to one revolution.

In each embodiment described above, the present invention is applied to a three-phase rotary type brushless motor. However, it is possible to apply the present invention to other brushless motors than the three-phase type brushless motor. In each embodiment described above, the present invention is applied to a brushless motor in which the Hall elements are used as the magnetic detector for driving. However, it is possible to apply the present invention to a brushless motor in which a magnetic detector for driving except for the Hall element is used such as a choke coil or a magneto-resistance effect element.

In the above embodiment, the output signals $H_1$, $H_2$ among the output signals $H_1$, $H_2$, $H_3$ outputted from the three magnetic detectors are added by the analog adder. The thus synthesized signal is impressed upon the comparator 25, and the output signal $H_2$ is impressed upon the comparator 26. However, it should be noted that the present invention is not limited to the specific embodiment. When the output signals $H_1$, $H_2$, $H_3$ outputted from the magnetic detector are added, they may be arbitrarily combined with each other.

As described above, according to the position detector of the present invention, the magnetic detector for driving is used as a magnetic detector for positional detection. Accordingly, it is not necessary to provide a magnetic detector and a magnet piece which are conventionally used. Therefore, the cost can be reduced, and further it becomes unnecessary to attach the magnet piece and the magnetic detector onto the base board. Therefore, the cost is reduced. A space in which the magnetic detector is installed is not required, and further a space in which the wiring of the magnetic detector is installed is not required, either. Consequently, it is possible to downsize the brushless motor.

In the present invention, the magnetic pole for positional detection is magnetized at a position shifted from the magnetic center of the magnetic pole for driving by an electrical angle of about 30°, so that the position detecting signal can be positively obtained. Accordingly, in addition to the above effects, it is possible to obtain a position detecting signal in a good condition, and the reliability of the device can be enhanced.

What is claimed is:

1. A position detector of a brushless motor, comprising:

a rotor magnet which includes alternately arranged N and S driving magnetic poles used for driving the motor, the rotor magnet being rotated integrally with a rotary shaft, a portion of a first of said driving magnetic poles serving as a position detection magnetic pole, said position detection magnetic pole being offset by an electrical angle of about 30° from a magnetic center of the first driving magnetic pole;

a plurality of magnetic detectors for detecting the magnetic fields of both the first driving magnetic pole and the position detection magnetic pole, the magnetic detectors being opposed to the rotor magnet; and a position signal generator for synthesizing a position detection signal from output signals of the plurality of magnetic detectors, wherein the position signal generator includes a circuit structure for compressing and elongating a pulse width of a rectangular wave obtained from waveform shaping the output signals of the magnetic detectors.

2. A position detector of a brushless motor, comprising:

a rotor magnet which includes alternately arranged N and S driving magnetic poles used for driving the motor, the rotor magnet being rotated integrally with a rotary shaft, a portion of a first of said driving magnetic poles serving as a position detection magnetic pole, said position detection magnetic pole being offset by an electrical angle of about 30° from a magnetic center of the first driving magnetic pole;

first, second and third magnetic detectors for detecting the magnetic fields of both the first driving magnetic pole and the position detection magnetic pole the magnetic detectors being opposed to the rotor magnet; and a position signal generator for synthesizing a position detection signal from output signals of the magnetic detectors wherein the position signal generator includes:

an analog adder for adding the output signals of the first and second magnetic detectors;

a first comparator for shaping a waveform of an output signal of the analog adder into a rectangular waveform; and a second comparator for shaping a waveform of the output signal of the third magnetic detector into a rectangular waveform; and a gate circuit for forming the position detection signal from output signals of the first and the second comparators.

3. The position detector of a brushless motor according to claim 1, wherein a portion of a second of said driving magnetic poles serves as a position detection magnetic pole, the position detection magnetic pole of the second driving circuit being offset by a predetermined electrical angle from a magnetic center of the second driving magnetic pole, such that the position detection magnetic pole of the first driving magnetic pole and the position detection magnetic pole of the second driving magnetic pole are offset in opposite directions.

4. The position detector of a brushless motor according to claim 1, wherein the magnetic detectors are Hall elements.

5. The position detector of a brushless motor according to claim 1, wherein the magnetic detectors are choke coils.

6. The position detector of a brushless motor according to claim 1, wherein the magnetic detectors are magneto-resistance effect elements.

7. The position detector of a brushless motor according to claim 1, further comprising a motor drive circuit, wherein the output signals of the plurality of magnetic detectors are input into the position signal generator without being compressed and are input into the motor drive circuit after being compressed.

8. The position detector of a brushless motor according to claim 2, wherein a portion of a second of said driving magnetic poles serves as a position detection magnetic pole, the position detection magnetic pole of the second driving circuit being offset by a predetermined electrical angle from a magnetic center of the second driving magnetic pole, such that the position detection magnetic pole of the first driving magnetic pole and the position detection magnetic pole of the second driving magnetic pole are offset in opposite directions.

9. The position detector of a brushless motor according to claim 2, wherein the first, second and third magnetic detectors are Hall elements.

10. The position detector of a brushless motor according to claim 2, wherein the first, second and third magnetic detectors are choke coils.

11. The position detector of a brushless motor according to claim 2, wherein the first, second and third magnetic detectors are magneto-resistance effect elements.

12. The position detector of a brushless motor according to claim 2, further comprising a motor drive circuit, wherein the output signals of the first, second and third magnetic detectors are input into the position signal generator without being compressed and are input into the motor drive circuit after being compressed.

* * * * *